US012784308B2

(12) United States Patent
Wang et al.

(10) Patent No.: US 12,784,308 B2
(45) Date of Patent: Nov. 3, 2026

(54) SYSTEMS AND METHODS FOR REDUCING ARTIFACT IN MEDICAL IMAGES USING SIMULATED IMAGES

(71) Applicant: GE Precision Healthcare LLC, Waukesha, WI (US)

(72) Inventors: Xinzeng Wang, Houston, TX (US); Xucheng Zhu, Menlo Park, CA (US); Graeme C Mckinnon, Waukesha, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 395 days.

(21) Appl. No.: 18/493,698

(22) Filed: Oct. 24, 2023

(65) Prior Publication Data

US 2025/0131614 A1 Apr. 24, 2025

(51) Int. Cl.

| | |
|---|---|
| ***G06T 12/00*** | (2026.01) |
| ***G06T 5/50*** | (2006.01) |
| ***G06T 5/90*** | (2024.01) |
| ***G06T 7/20*** | (2017.01) |

(52) U.S. Cl.

CPC ................ *G06T 12/00* (2026.01); *G06T 5/50* (2013.01); *G06T 5/90* (2024.01); *G06T 7/20* (2013.01); *G06T 2207/10088* (2013.01); *G06T 2207/20081* (2013.01); *G06T 2207/20084* (2013.01); *G06T 2207/30004* (2013.01)

(58) Field of Classification Search

CPC . G06T 11/003; G06T 5/50; G06T 5/90; G06T 7/20; G06T 2207/10088; G06T 2207/20081; G06T 2207/20084; G06T 2207/30004; G06T 11/008; G06T 2207/10024; G06N 3/0464; G06N 3/084

USPC .......................................................... 382/128

See application file for complete search history.

(56) References Cited

U.S. PATENT DOCUMENTS

| | | | | |
|---|---|---|---|---|
| 10,635,943 | B1 * | 4/2020 | Lebel | G06F 18/2148 |
| 10,698,063 | B2 * | 6/2020 | Braun | G01R 33/56509 |
| 2019/0104940 | A1 * | 4/2019 | Zhou | G06T 11/008 |
| 2020/0065969 | A1 * | 2/2020 | Huang | G06T 7/11 |

(Continued)

OTHER PUBLICATIONS

Wu, Yunan, et al. "Image-based motion artifact reduction on liver dynamic contrast enhanced MRI." Physica Medica 105 (2023): 102509. (Year: 2023).*

(Continued)

*Primary Examiner* — Sumati Lefkowitz
*Assistant Examiner* — Dion J Satcher
(74) *Attorney, Agent, or Firm* — McCoy Russell LLP

(57) ABSTRACT

The current disclosure provides methods and systems to reduce an amount of artifact in image data. In one example, a method for an image processing system comprises generating a plurality of simulated images, generating a set of training image pairs based on the plurality of simulated magnetic resonance images, training an artifact removal neural network using the set of training image pairs, and generating an output of the artifact removal neural network based on an inputted acquired image, wherein generating the plurality of simulated images comprises generating images from RGB images, simulating motion in the simulated images, simulating contrast in the simulated images, and simulating phase contrast dynamics in the simulated images.

19 Claims, 10 Drawing Sheets

(56) References Cited

U.S. PATENT DOCUMENTS

| | | | | |
|---|---|---|---|---|
| 2020/0294287 | A1* | 9/2020 | Schlemper | G01R 33/5611 |
| 2022/0392018 | A1* | 12/2022 | Chen | G01R 33/5608 |
| 2022/0413074 | A1* | 12/2022 | Nehrke | G01R 33/5608 |

OTHER PUBLICATIONS

Lee, Seul, et al. "Deep learning in MR motion correction: a brief review and a new motion simulation tool (view2Dmotion)." Investigative Magnetic Resonance Imaging 24.4 (2020): 196-206. (Year: 2020).*

Boeckh-Behrens, T. et al., "Susceptibility-weighted angiography (SWAN) of cerebral veins and arteries compared to TOF-MRA," European Journal of Radiology, vol. 81, No. 6, Jun. 2012, 8 pages.

Eldeniz, C. et al., "Phase2Phase Respiratory Motion-Resolved Reconstruction of Free-Breathing Magnetic Resonance Imaging Using Deep Learning Without a Ground Truth for Improved Liver Imaging," Investigative Radiology, vol. 56, No. 12, Dec. 1, 2021, 11 pages.

Jafari, R. et al., "GRASPNET: Fast spatiotemporal deep learning reconstruction of golden-angle radial data for free-breathing dynamic contrast-enhanced magnetic resonance imaging," NMR in Biomedicine, vol. 36, No. 3, Mar. 2023, Available Online Nov. 25, 2022, 11 pages.

"Dixon Method—What is the Dixon method of fat suppression? When should it be used?," MRI Questions Website, Available Online at https://mriquestions.com/dixon-method.html, Available as Early as Feb. 10, 2016, 3 pages.

Duffy, B. et al., "Retrospective motion artifact correction of structural MRI images using deep learning improves the quality of cortical surface reconstructions," Neurolmage, vol. 230, Apr. 15, 2021, 13 pages.

Freedman, J. et al., "Rapid 4D-MRI reconstruction using a deep radial convolutional neural network: Dracula," Radiotherpay and Oncology, vol. 159, Jun. 2021, Available Online Apr. 2, 2021, 9 pages.

* cited by examiner

804

802

800

SYSTEMS AND METHODS FOR REDUCING ARTIFACT IN MEDICAL IMAGES USING SIMULATED IMAGES

TECHNICAL FIELD

Embodiments of the subject matter disclosed herein relate to medical imaging, and more particularly, to systems and methods for removing artifact from medical images.

BACKGROUND

Medical images such as magnetic resonance (MR) images may be acquired over various phases. Multi-phase data provides a larger amount of data, whereby images are acquired at multiple points in time, providing for various imaged phases or echoes, but in turn demands a longer scan time than single phase imaging. To reduce scan time, each phase may be undersampled in the k-space as redundant data exists between the acquired phases. Undersampling of data may result in increased artifacts in outputted MR images, which may reduce a quality of the images and hinder diagnosis. Various approaches have been taken to reduce or remove these undersampling artifacts, including mutual reconstruction methods that make use of temporal information, however such methods often require high computational demands. In some examples, a convolutional neural network (CNN) may be trained to reduce artifacts in MR images which allows for reduction of computational requirements during reconstruction. The CNN may be trained on image pairs including a first, undersampled input image, and a second, fully sampled target (ground truth) image. The CNN learns to map the undersampled images to the fully sampled images, and when trained, the CNN may output artifact-reduced versions of MR images inputted into the CNN.

However, MR images often include motion, for example periodic motion such as respiration. Obtaining motion-free images and/or fully sampled contrast-enhanced images with high temporal resolution to use as targets for training of the CNN is challenging and therefore unavailability of adequate ground truth data renders such CNNs unfeasible for application.

BRIEF DESCRIPTION

In one example, a method for an image processing system comprises generating a plurality of simulated images, wherein the plurality of simulated images include simulated motion, contrast, and phase contrast dynamics, generating a set of training image pairs based on the plurality of simulated magnetic resonance images, training an artifact removal neural network using the set of training image pairs; and generating an output of the artifact removal neural network based on an inputted acquired image, wherein generating the plurality of simulated images comprises generating images from RGB images, simulating motion in the simulated images, simulating contrast in the simulated images, and simulating phase contrast dynamics in the simulated images.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

Figure 1:
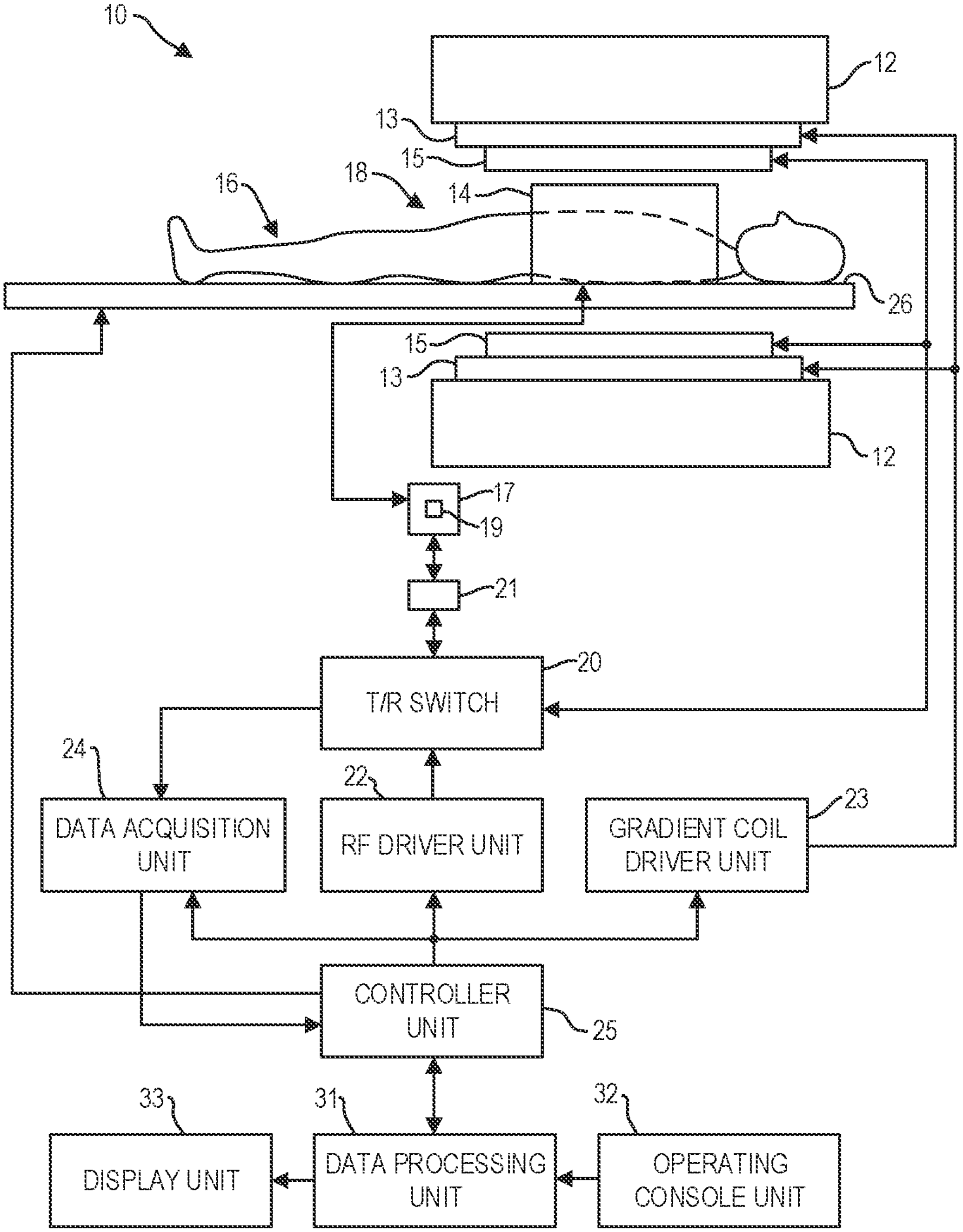
FIG. 1 shows a block diagram of an MRI system according to one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

Methods and systems are provided herein for reducing artifact in medical image data, such as undersampled magnetic resonance (MR) images. Multi-phase and/or multi-echo imaging, which describes imaging techniques where imaging data is acquired at various phases or echoes, for example as a contrast agent moves through a patient, often demands longer scan times than single-phase and/or single-echo imaging. MRI imaging produces cross-sectional images with high spatial resolution using nuclear magnetic resonances, gradient fields, and hydrogen atoms inside the subject. MRI scan time may be proportional or roughly proportional to number of time-consuming phase-encoding steps in k-space. In an effort to reduce scan time, multi-phase and/or multi-echo data is often undersampled in the k-space. However, undersampling often results in undersampling oriented artifacts in MR images.

Various approaches have been formulated to reduce undersampling oriented artifacts. For example, advanced joint or mutual reconstruction methods utilize temporal information in the multiple phases and/or echoes to reduce artifacts in outputted reconstructed images. However, such methods suffer from high processing and/or computational demands. Recently, deep learning based methods have been developed to address the high processing demands of methods like joint reconstruction, however a lack of a proper set of ground truth data for deep learning methods to be trained on is a challenge. For example, in vivo imaging often includes motion artifact, for example due to periodic and/or, in some cases, non-periodic motion. As such, properly matched input and target images for neural network training are not readily available.

To increase availability of training data for deep learning based neural networks, systems and methods are herein proposed that rely on high-quality, high resolution simulated training data. While other approaches have included training of deep learning based networks, generation of simulated images as training data may allow for 1-1 matching of input and target images. The simulated images may include simulated motion, simulated contrast levels, and simulated phase contrast dynamics which may be present in certain MRI applications. Periodic motion, such as respiration, is reproducible because of known cycles, and therefore motion phases may be simulated in the simulated MR images. Various contrast levels at different phases in multi-phase and/or multi-echo imaging may also be reproducible in a similar fashion to allow the simulated MR images to include such data.

Training datasets, including training image pairs may be generated based on the simulated images. For example, the simulated images may be based on high-quality reference images (e.g., natural images) from RGB channels. These high-quality simulated images may be respective targets in training image pairs. Corresponding inputs may be generated by undersampling the simulated images in the k-space such that the input images are lower resolution due to undersampling oriented artifact. By training an artifact removal neural network based on these training image pairs of simulated images, artifact-reduced images based on undersampled inputted images may be outputted and displayed. Use of deep learning and the neural networks herein described may reduce scan time while reducing artifact and allowing for high temporal resolution for more accurate diagnosis and higher diagnostic confidence.

Figure 8:
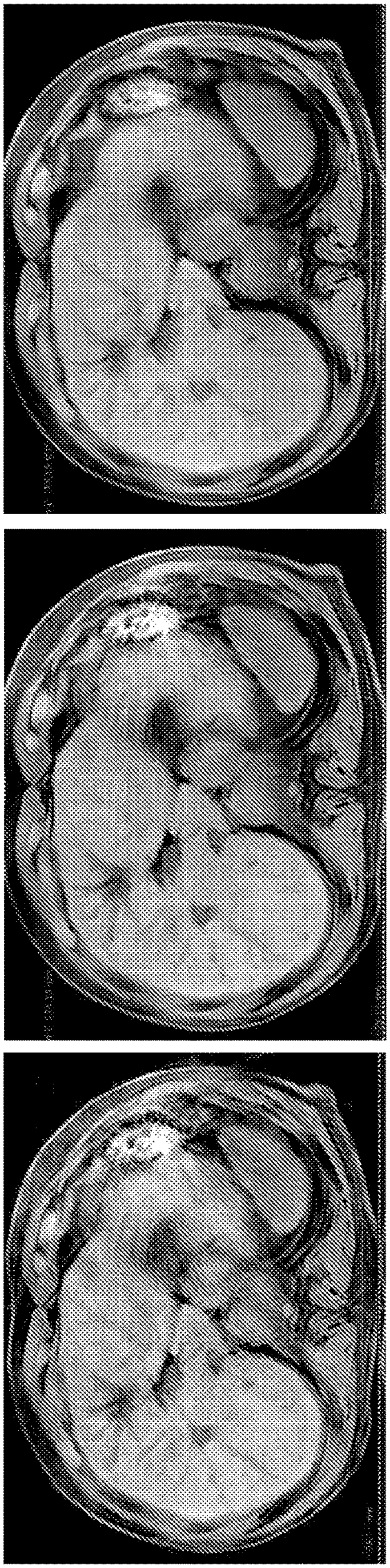
FIG. 8 shows an example input, target, and output MR image, in accordance with one or more embodiments of the present disclosure.
Figure 9:
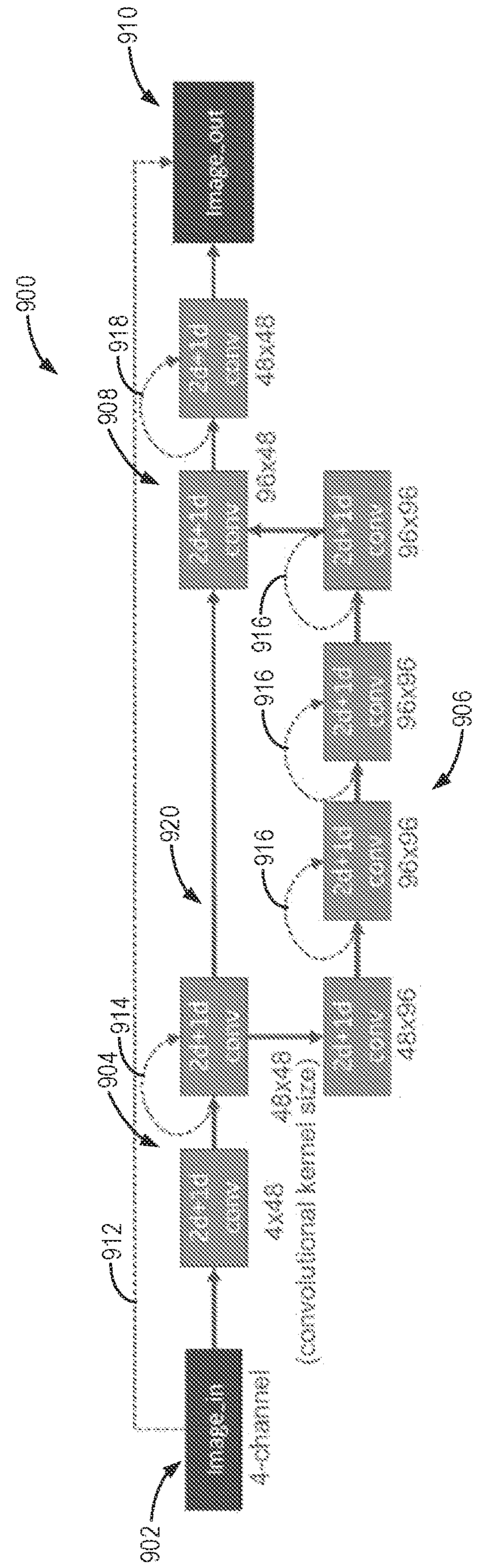
FIG. 9 shows an architecture diagram of a first neural network, in accordance with one or more embodiments of the present disclosure.
Figure 10:
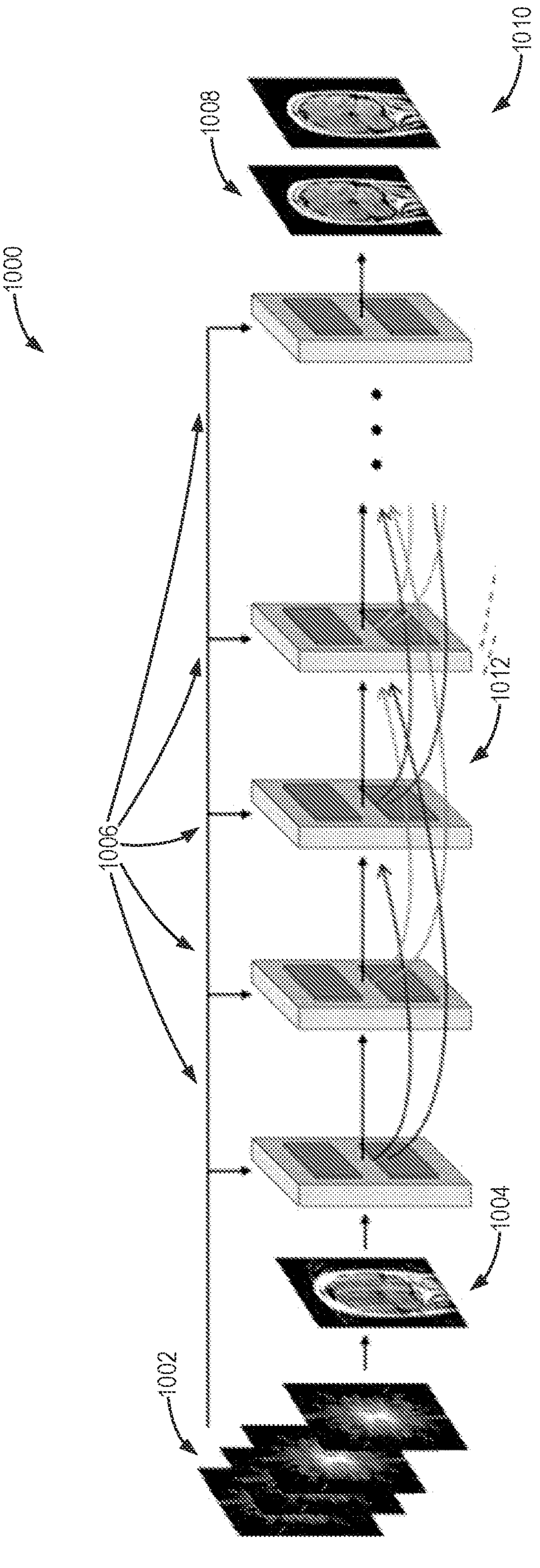
FIG. 10 shows an architecture diagram of a second neural network, in accordance with one or more embodiments of the present disclosure.

In an embodiment, medical images may be acquired by an imaging system, such as MRI system shown in FIG. 1. Artifact may be reduced or removed from an image by an image processing system, such as the image processing system 202 of FIG. 2. The image processing system may include an artifact removal neural network model that takes as input an undersampled image, and outputs an artifact-reduced version of the image. The artifact removal neural network model may be trained by following one or more steps of the method of FIG. 4, as described in relation to the neural network training system of FIG. 3. The noise reduction neural network model may be trained on synthetic MR data, which may be generated by following one or more steps of the method of FIG. 5. The simulated data may include simulated motion phase and contrast phases, as demonstrated in FIGS. 7A and 7B. Examples of an undersampled input image, a corresponding high-quality target image, and an output image of a neural network are shown in FIG. 8. Architecture diagrams of a first and second neural network as herein described are shown in FIGS. 9 and 10.

FIG. 1 illustrates an exemplary imaging system as may be used to acquire medical imaging data. While FIG. 1 illustrates a magnetic resonance imaging (MRI) system, it should be understood that other medical imaging systems may be used without departing from the scope of this disclosure. FIG. 1 illustrates a magnetic resonance imaging (MRI) apparatus 10 that includes a magnetostatic field magnet unit 12, a gradient coil unit 13, an RF coil unit 14, an RF body or volume coil unit 15, a transmit/receive (T/R) switch 20, an RF driver unit 22, a gradient coil driver unit 23, a data acquisition unit 24, a controller unit 25, a patient table or bed 26, a data processing unit 31, an operating console unit 32, and a display unit 33. In some embodiments, the RF coil unit 14 is a surface coil, which is a local coil typically placed proximate to the anatomy of interest of a subject 16. Herein, the RF body coil unit 15 is a transmit coil that transmits RF signals, and the local surface RF coil unit 14 receives the MR signals. As such, the transmit body coil (e.g., RF body coil unit 15) and the surface receive coil (e.g., RF coil unit 14) are separate but electromagnetically coupled components. The MRI apparatus 10 transmits electromagnetic pulse signals to the subject 16 placed in an imaging space 18 with a static magnetic field formed to perform a scan for obtaining magnetic resonance signals from the subject 16. One or more images of the subject 16 can be reconstructed based on the magnetic resonance signals thus obtained by the scan.

The magnetostatic field magnet unit 12 includes, for example, an annular superconducting magnet, which is mounted within a toroidal vacuum vessel. The magnet defines a cylindrical space surrounding the subject 16 and generates a constant primary magnetostatic field B0.

The MRI apparatus 10 also includes a gradient coil unit 13 that forms a gradient magnetic field in the imaging space 18 so as to provide the magnetic resonance signals received by the RF coil arrays with three-dimensional positional information. The gradient coil unit 13 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 13 applies a gradient field in the slice selection direction (or scan direction) of the subject 16, to select the slice; and the RF body coil unit 15 or the local RF coil arrays may transmit an RF pulse to a selected slice of the subject 16. The gradient coil unit 13 also applies a gradient field in the phase encoding direction of the subject 16 to phase encode the magnetic resonance signals from the slice excited by the RF pulse. The gradient coil unit 13 then applies a gradient field in the frequency encoding direction of the subject 16 to frequency encode the magnetic resonance signals from the slice excited by the RF pulse.

The RF coil unit 14 is disposed, for example, to enclose the region to be imaged of the subject 16. In some examples, the RF coil unit 14 may be referred to as the surface coil or the receive coil. In the static magnetic field space or imaging space 18 where a static magnetic field B0 is formed by the magnetostatic field magnet unit 12, the RF coil unit 15 transmits, based on a control signal from the controller unit 25, an RF pulse that is an electromagnet wave to the subject

16 and thereby generates a high-frequency magnetic field B1. This excites a spin of protons in the slice to be imaged of the subject 16. The RF coil unit 14 receives, as a magnetic resonance signal, the electromagnetic wave generated when the proton spin thus excited in the slice to be imaged of the subject 16 returns into alignment with the initial magnetization vector. In some embodiments, the RF coil unit 14 may transmit the RF pulse and receive the MR signal. In other embodiments, the RF coil unit 14 may only be used for receiving the MR signals, but not transmitting the RF pulse.

The RF body coil unit 15 is disposed, for example, to enclose the imaging space 18, and produces RF magnetic field pulses orthogonal to the main magnetic field B0 produced by the magnetostatic field magnet unit 12 within the imaging space 18 to excite the nuclei. In contrast to the RF coil unit 14, which may be disconnected from the MRI apparatus 10 and replaced with another RF coil unit, the RF body coil unit 15 is fixedly attached and connected to the MRI apparatus 10. Furthermore, whereas local coils such as the RF coil unit 14 can transmit to or receive signals from only a localized region of the subject 16, the RF body coil unit 15 generally has a larger coverage area. The RF body coil unit 15 may be used to transmit or receive signals to the whole body of the subject 16, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 14 and/or the RF body coil unit 15 depends on the imaging application.

The T/R switch 20 can selectively electrically connect the RF body coil unit 15 to the data acquisition unit 24 when operating in receive mode, and to the RF driver unit 22 when operating in transmit mode. Similarly, the T/R switch 20 can selectively electrically connect the RF coil unit 14 to the data acquisition unit 24 when the RF coil unit 14 operates in receive mode, and to the RF driver unit 22 when operating in transmit mode. When the RF coil unit 14 and the RF body coil unit 15 are both used in a single scan, for example if the RF coil unit 14 is configured to receive MR signals and the RF body coil unit 15 is configured to transmit RF signals, then the T/R switch 20 may direct control signals from the RF driver unit 22 to the RF body coil unit 15 while directing received MR signals from the RF coil unit 14 to the data acquisition unit 24. The coils of the RF body coil unit 15 may be configured to operate in a transmit-only mode or a transmit-receive mode. The coils of the local RF coil unit 14 may be configured to operate in a transmit-receive mode or a receive-only mode.

The RF driver unit 22 includes a gate modulator (not shown), an RF power amplifier (not shown), and an RF oscillator (not shown) that are used to drive the RF coils (e.g., RF coil unit 15) and form a high-frequency magnetic field in the imaging space 18. The RF driver unit 22 modulates, based on a control signal from the controller unit 25 and using the gate modulator, the RF signal received from the RF oscillator into a signal of predetermined timing having a predetermined envelope. The RF signal modulated by the gate modulator is amplified by the RF power amplifier and then output to the RF coil unit 15.

The gradient coil driver unit 23 drives the gradient coil unit 13 based on a control signal from the controller unit 25 and thereby generates a gradient magnetic field in the imaging space 18. The gradient coil driver unit 23 includes three systems of driver circuits (not shown) corresponding to the three gradient coil systems included in the gradient coil unit 13.

The data acquisition unit 24 includes a pre-amplifier (not shown), a phase detector (not shown), and an analog/digital converter (not shown) used to acquire the magnetic resonance signals received by the RF coil unit 14. In the data acquisition unit 24, the phase detector phase detects, using the output from the RF oscillator of the RF driver unit 22 as a reference signal, the magnetic resonance signals received from the RF coil unit 14 and amplified by the pre-amplifier, and outputs the phase-detected analog magnetic resonance signals to the analog/digital converter for conversion into digital signals. The digital signals thus obtained are output to the data processing unit 31.

The MRI apparatus 10 includes a table 26 for placing the subject 16 thereon. The subject 16 may be moved inside and outside the imaging space 18 by moving the table 26 based on control signals from the controller unit 25.

The controller unit 25 includes a computer and a recording medium on which a program to be executed by the computer is recorded. The program when executed by the computer causes various parts of the apparatus to carry out operations corresponding to pre-determined scanning. The recording medium may comprise, for example, a ROM, flexible disk, hard disk, optical disk, magneto-optical disk, CD-ROM, or non-volatile memory card. The controller unit 25 is connected to the operating console unit 32 and processes the operation signals input to the operating console unit 32 and furthermore controls the table 26, RF driver unit 22, gradient coil driver unit 23, and data acquisition unit 24 by outputting control signals to them. The controller unit 25 also controls, to obtain a desired image, the data processing unit 31 and the display unit 33 based on operation signals received from the operating console unit 32.

The operating console unit 32 includes user input devices such as a touchscreen, keyboard and a mouse. The operating console unit 32 is used by an operator, for example, to input such data as an imaging protocol and to set a region where an imaging sequence is to be executed. The data about the imaging protocol and the imaging sequence execution region are output to the controller unit 25.

The data processing unit 31 includes a computer and a recording medium on which a program to be executed by the computer to perform predetermined data processing is recorded. The data processing unit 31 is connected to the controller unit 25 and performs data processing based on control signals received from the controller unit 25. The data processing unit 31 is also connected to the data acquisition unit 24 and generates spectrum data by applying various image processing operations to the magnetic resonance signals output from the data acquisition unit 24.

The display unit 33 includes a display device and displays an image on the display screen of the display device based on control signals received from the controller unit 25. The display unit 33 displays, for example, an image regarding an input item about which the operator inputs operation data from the operating console unit 32. The display unit 33 also displays a two-dimensional (2D) slice image or three-dimensional (3D) image of the subject 16 generated by the data processing unit 31.

Though a MRI system is described by way of example, it should be understood that the present techniques may also be useful when applied to images acquired using other imaging modalities, such as CT, tomosynthesis, PET, C-arm angiography, and so forth. The present discussion of an MRI imaging modality is provided merely as an example of one suitable imaging modality.

Figure 2:
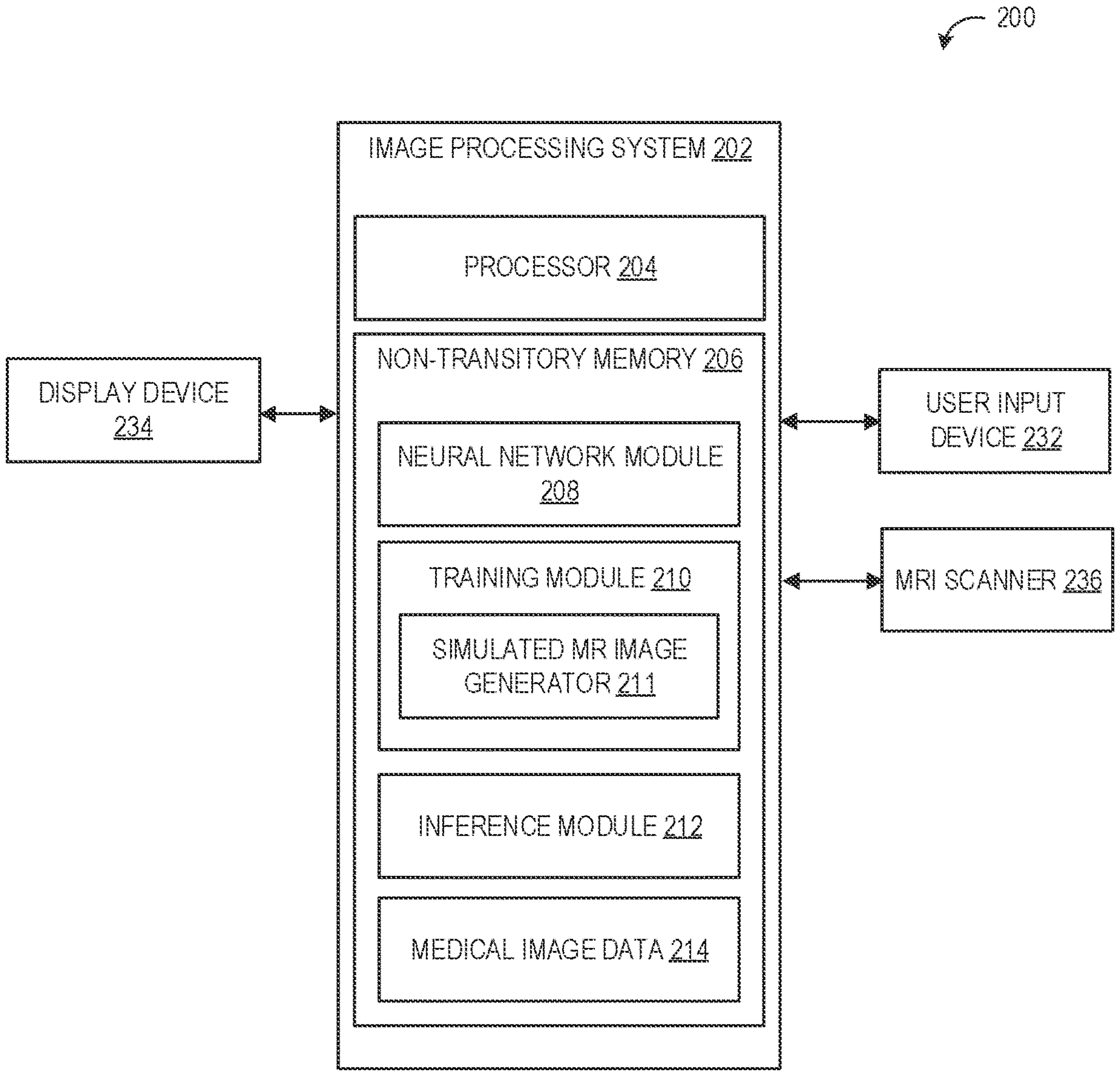
FIG. 2 shows a block diagram of an exemplary embodiment of an image processing system, in accordance with one or more embodiments of the present disclosure.

Referring now to FIG. 2, an image processing system 202 of a medical imaging system 200 is shown, in accordance with an embodiment. In some embodiments, at least a portion of image processing system 202 is disposed at a device (e.g., edge device, server, etc.) communicably coupled to the medical imaging system 200 via wired and/or wireless connections. In some embodiments, at least a portion of image processing system 202 is disposed at a separate device (e.g., a workstation) which can receive images from the medical imaging system 200 or from a storage device which stores the images/data generated by the medical imaging system 200. It should be understood that while MRI systems, MR images, and simulated MR images are herein described, other types of imaging and images are also possible without departing from the scope of this disclosure.

Image processing system 202 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may store a neural network module 208, a network training module 210, an inference module 212, and medical image data 214. Neural network module 208 may include a deep learning network and instructions for implementing the deep learning network to reduce or optionally remove noise from a medical image of the medical image data 214, as described in greater detail below. Neural network module 208 may include one or more trained and/or untrained neural networks and may further include various data, or metadata pertaining to the one or more neural networks stored therein.

Training module 210 may comprise instructions for training one or more of the neural networks implementing a deep learning model stored in neural network module 208. In particular, training module 210 may include instructions that, when executed by the processor 204, cause image processing system 202 to conduct one or more of the steps of method 400 for training the one or more neural networks in a training stage, discussed in more detail below in reference to FIGS. 3 and 4. Training module 210 may include a simulated MR image generator 211, which may be used to generate simulated images and training data to train the one or more neural networks, as described in greater detail below in reference to FIGS. 3 and 5. In some embodiments, training module 210 includes instructions for implementing one or more gradient descent algorithms, applying one or more loss functions, and/or training routines, for use in adjusting parameters of the one or more neural networks of neural network module 208. Non-transitory memory 206 also stores an inference module 212 that comprises instructions for reducing an amount of artifact in new image data with the trained deep learning model.

Non-transitory memory 206 further stores medical image data 214. Medical image data 214 may include for example, medical images acquired via an MRI scanner, a CT scanner, a scanner for spectral imaging, or via a different imaging modality. For example, the medical image data 214 may store images acquired via an MRI scanner of the same anatomical features of a same patient. Medical image data 214 may also include histological images of anatomical structures generated from slices of anatomical specimen.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

Image processing system 202 may be operably/communicatively coupled to a user input device 232 and a display device 234. User input device 232 may comprise one or more of a touchscreen, a keyboard, a mouse, a trackpad, a motion sensing camera, or other device configured to enable a user to interact with and manipulate data within image processing system 202. Display device 234 may include one or more display devices utilizing virtually any type of technology. In some embodiments, display device 234 may comprise a computer monitor, and may display medical images. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view medical images produced by a medical imaging system, and/or interact with various data stored in non-transitory memory 206. In some examples, the display device 234 may be the display unit 33 of FIG. 1 and the user input device 232 may be at least part of the operating console unit 32 of FIG. 1.

Image processing system 202 may be operably/communicatively coupled to an MRI scanner 236. MRI scanner 236 may be any MRI imaging device configured to image a subject such as a patient, an inanimate object, one or more manufactured parts, and/or foreign objects such as dental implants, stents, and/or contrast agents present within the body, such as MRI apparatus 10 of FIG. 1. Image processing system 202 may receive MRI imaging data from MRI scanner 236, process the received MRI imaging data via processor 204 based on instructions stored in one or more modules of non-transitory memory 206, and/or store the received MRI imaging data in medical image data 214.

It should be understood that image processing system 202 shown in FIG. 1 is for illustration, not for limitation. Another appropriate image processing system may include more, fewer, or different components.

Figure 3:
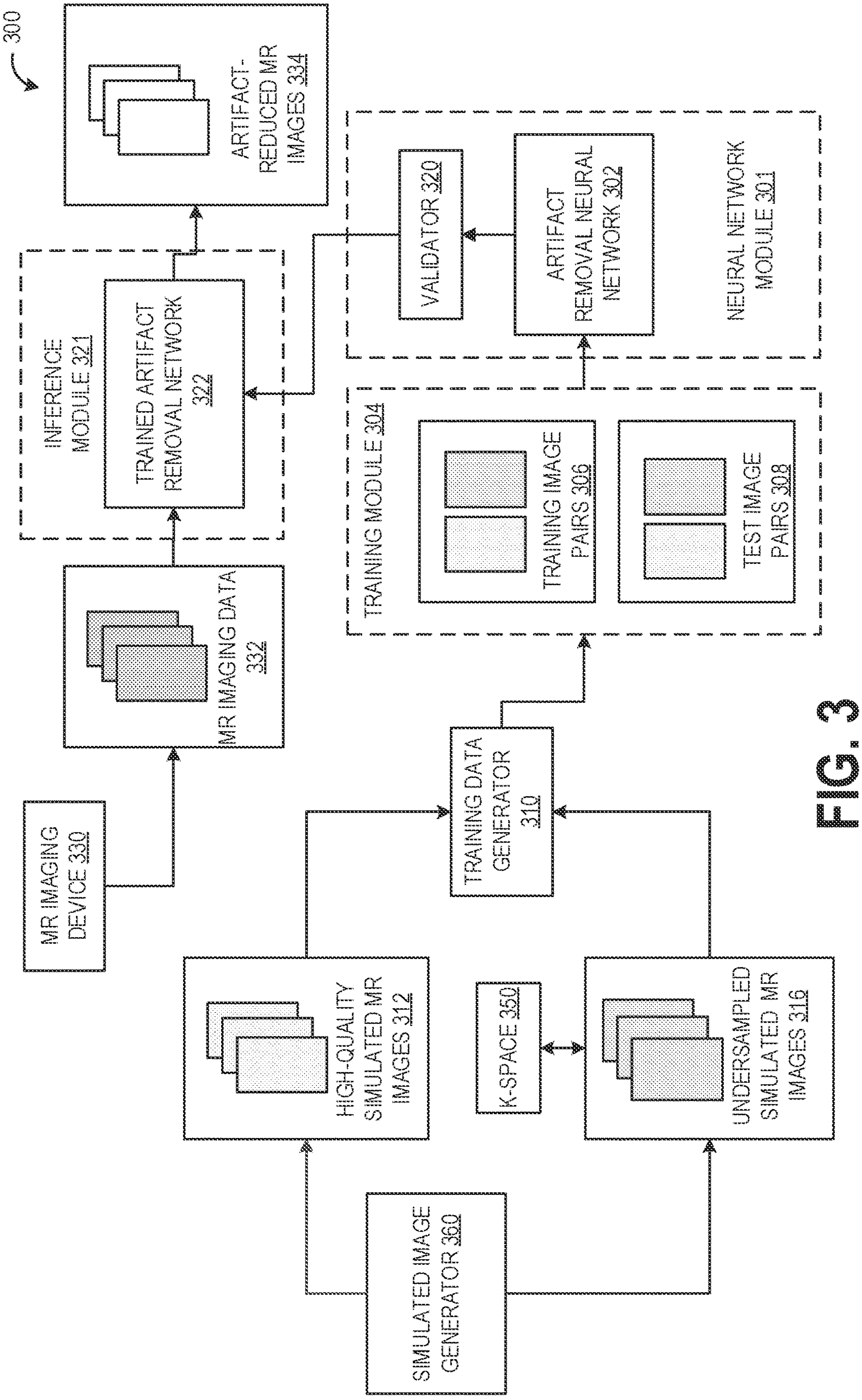
FIG. 3 shows a block diagram of an exemplary embodiment of an artifact removal neural network training system for training a neural network, in accordance with one or more embodiments of the present disclosure.

Referring to FIG. 3, an example of a artifact removal neural network training system 300 is shown, which may be used to train a neural network such as a artifact removal neural network 302. Artifact removal neural network 302 may be trained to detect and reduce or optionally remove noise from two dimensional (2D) CT images, in accordance with one or more operations described in greater detail below in reference to method 300 of FIG. 3. Artifact removal neural network training system 300 may be implemented by an image processing system, such as image processing system 202 of FIG. 1, to train artifact removal neural network 302 to detect and reduce or optionally remove artifact in an MR image.

In some embodiments, artifact removal neural network 302 may be a deep neural network with a plurality of hidden layers. In one embodiment, artifact removal neural network 302 is a convolutional neural network (CNN).

Artifact removal neural network 302 may be stored within a neural network module 301 of the image processing system. Neural network module 301 may be a non-limiting example of neural network module 208 of image processing system 202 of FIG. 2. Artifact removal neural network training system 300 also includes a training module 304, which includes a training dataset comprising a plurality of training pairs of data, such as image pairs divided into training image pairs 306 and test image pairs 308. Training module 304 may be a non-limiting example of training module 210 of image processing system 202 of FIG. 2.

A number of training image pairs 306 and test image pairs 308 may be selected to ensure that sufficient training data is available to prevent overfitting, whereby the artifact removal neural network 302 learns to map features specific to samples of the training set that are not present in the test set.

Each image pair of the training image pairs 306 and the test image pairs 308 comprises an input image and a target image. The input image and the target image may be simulated MR images generated from RGB (red-green-blue) reference images by simulated image generator 360, as will be further described with respect to FIG. 5. In various embodiments, the input image is a simulated MR image that has been undersampled in the k-space. During training, artifact removal neural network 302 may learn to distinguish the undersampling oriented artifact from anatomical features of the target image.

Artifact removal neural network training system 300 may include the simulated image generator 360, which may be used to generate simulated images of different motion stages, phases, and/or contrasts. The simulated image generator 360 may generate high-quality simulated MR images 312 and undersampled simulated MR images 316. The undersampled simulated MR images 316 may be corresponding undersampled versions of the simulated MR images 312 that are undersampled in k-space 350.

Artifact removal neural network training system 300 may include a training data generator 310, which may be used to generate the training image pairs 306 and the test image pairs 308 of the training module 304. Images from the high-quality simulated MR images 312 may be paired with images from undersampled simulated MR images 316 by training data generator 310. An example method for generating the training data is described in further detail below with respect to FIG. 5.

Once each image pair is generated, the image pair may be assigned to either the training image pairs 306 or the test image pairs 308. In an embodiment, the image pair may be assigned to either the training image pairs 306 or the test image pairs 308 randomly in a pre-established proportion. For example, the image pair may be assigned to either the training image pairs 306 or the test image pairs 308 randomly such that 90% of the image pairs generated are assigned to the training image pairs 306, and 10% of the image pairs generated are assigned to the test image pairs 308. Alternatively, the image pair may be assigned to either the training image pairs 306 or the test image pairs 308 randomly such that 85% of the image pairs generated are assigned to the training image pairs 306, and 15% of the image pairs generated are assigned to the test image pairs 308. It should be appreciated that the examples provided herein are for illustrative purposes, and image pairs may be assigned to the training image pairs 306 dataset or the test image pairs 308 dataset via a different procedure and/or in a different proportion without departing from the scope of this disclosure.

Artifact removal neural network training system 300 may include a validator 320 that validates the performance of the artifact removal neural network 302 against the test image pairs 308. The validator 320 may take as input a partially trained artifact removal neural network 302 and a dataset of test image pairs 308, and may output an assessment of the performance of the partially trained artifact removal neural network 302 on the dataset of test image pairs 308.

Once the artifact removal neural network 302 has been validated, a trained artifact removal neural network 322 (e.g., the validated artifact removal neural network 302) may be used to generate a set of artifact-reduced images 334 from a set of acquired (e.g., real) MR imaging data 332 (e.g., real MR images). The MR imaging data 332 may be undersampled data that is of lower quality due to artifacts. For example, the MR imaging data 332 may be acquired by an MR imaging device 330, which may be a non-limiting version of MRI scanner 236 of FIG. 2. Trained artifact removal neural network 322 may be stored within an inference module 321 of the image processing system (e.g., inference module 212 of FIG. 2).

Figure 4:
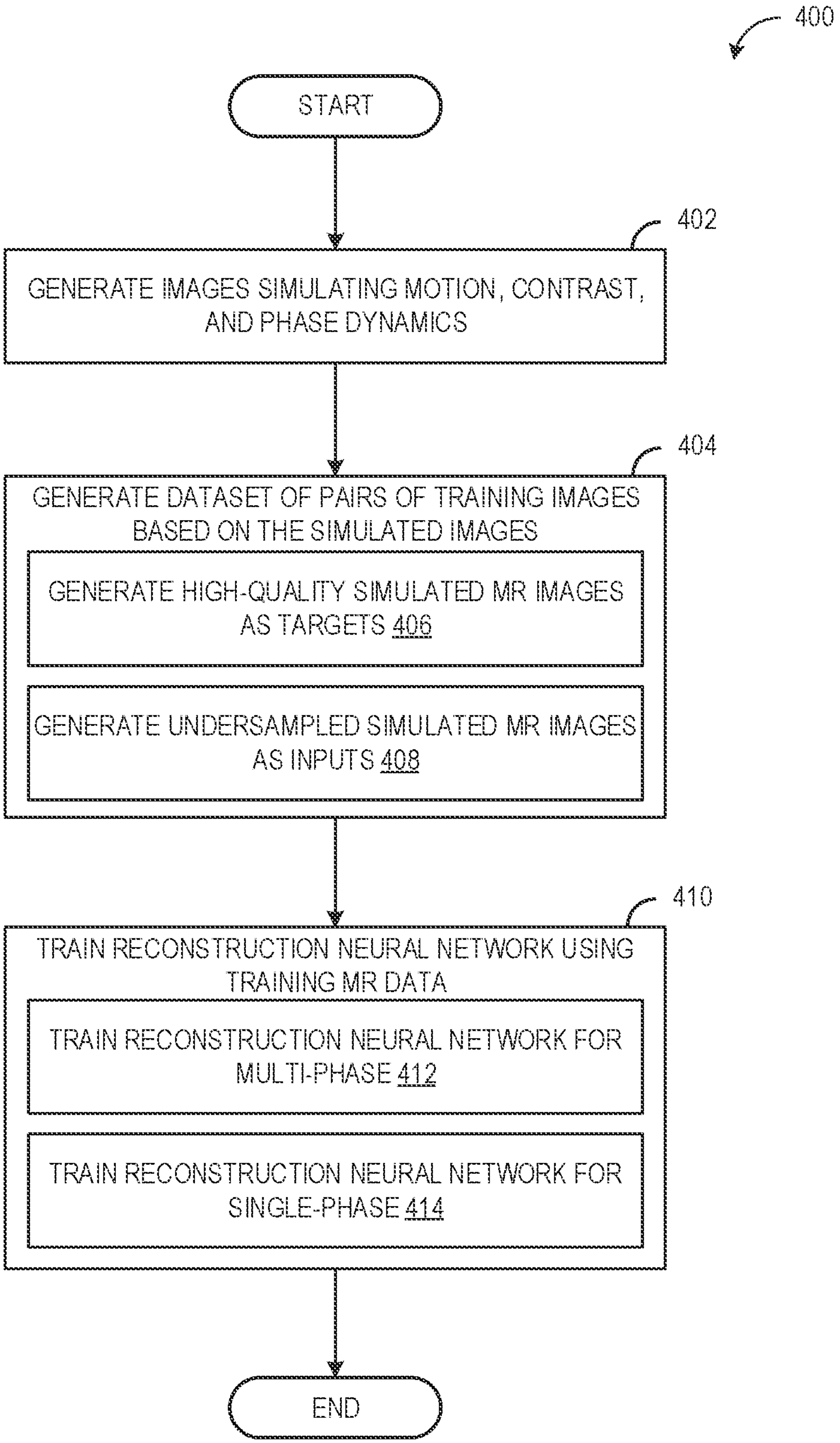
FIG. 4 shows a flowchart illustrating an exemplary method for training an artifact removal neural network, in accordance with one or more embodiments of the present disclosure.

Turning now to FIG. 4, a flowchart illustrating a method 400 for training an artifact removal neural network is shown. The artifact removal neural network may be a non-limiting example of the artifact removal neural network 302 of the artifact removal neural network training system 300 of FIG. 3, according to an exemplary embodiment. Method 400 may be executed by a processor of an image processing system, such as the image processing system 202 of FIG. 2. In an embodiment, some operations of method 400 may be stored in non-transitory memory of the image processing system (e.g., in a training module such as the training module 210 of the image processing system 202 of FIG. 2) and executed by a processor of the image processing system (e.g., the processor 204 of image processing system 202 of FIG. 2). The artifact removal neural network may be trained on training data comprising one or more sets of image pairs. Each image pair of the one or more sets of image pairs may comprise high-quality simulated MR images and corresponding undersampled simulated MR images, as described below. In some embodiments, the one or more sets of image pairs may be stored in a medical image dataset of the image processing system, such as the medical image data 214 of image processing system 202 of FIG. 2. Further, it should be understood that while the method 400 is described herein with respect to MRI imaging, MR images, and simulated MR images, other imaging modalities are possible without departing from the scope of this disclosure.

Figure 5:
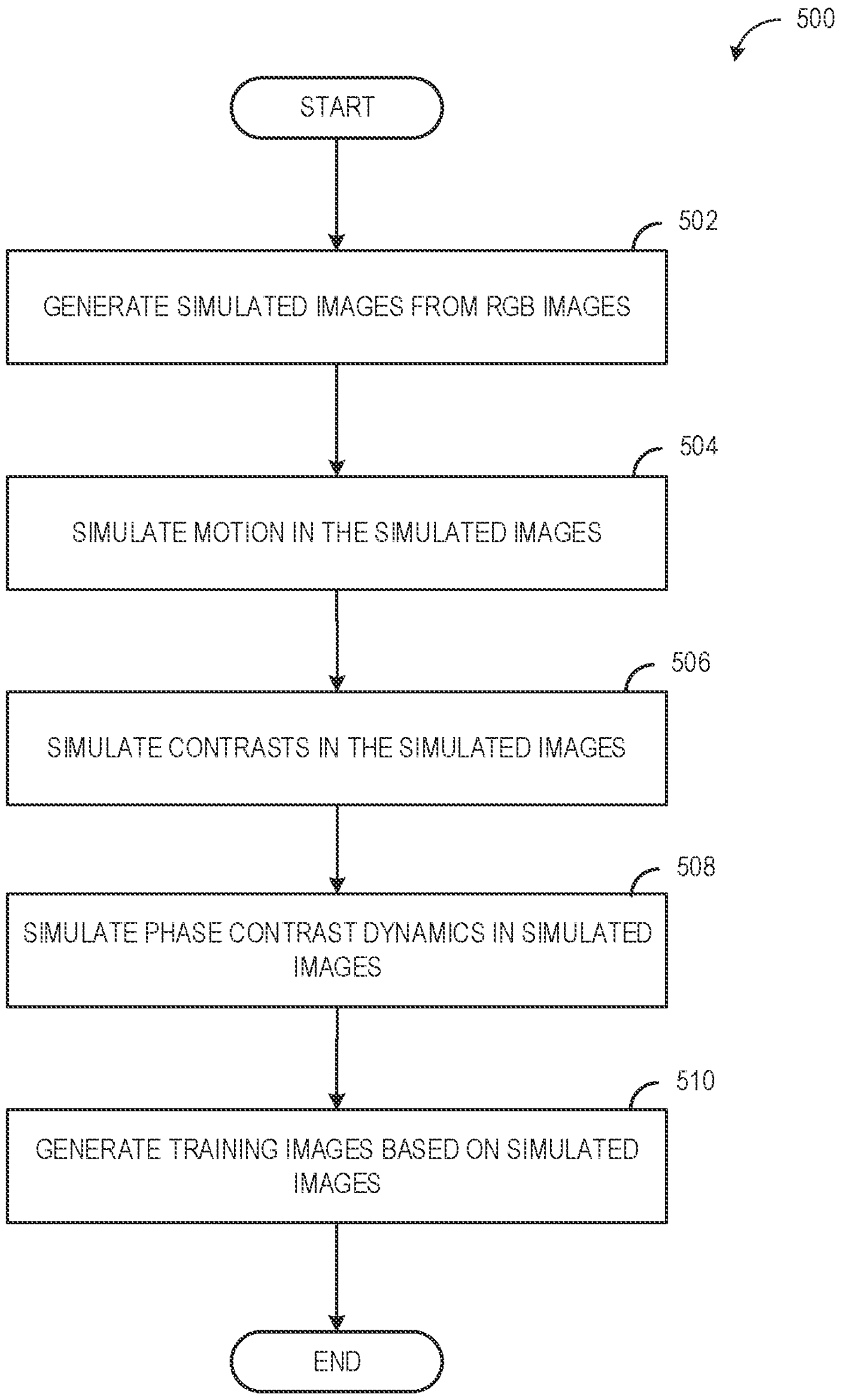
FIG. 5 shows a flowchart illustrating an exemplary method for simulating images to be used to train a neural network, in accordance with one or more embodiments of the present disclosure.

Method 400 begins at 402, where method 400 includes generating images simulating motion, contrast, and phase dynamics, as will be further described with respect to FIG. 5. Briefly, in some examples, simulating motion may include simulating various motion stages of a periodic or transient motion type. Simulating contrasts may comprise generating images at various signal intensities. Simulating phase contrast dynamics may comprise simulating phase changes in the images. The simulated images may be based on natural images, which may provide for a more robust dataset of images for training.

At 404, method 400 includes generating a dataset of pairs of training images based on the simulated images. Each training pair may include a target high-quality simulated image (e.g., a target simulated MR image) where high-quality herein means little to no artifact (e.g., a fully sampled image), and a corresponding version of the simulated image (e.g., an input simulated MR image) that is undersampled. As such, generating the dataset of pairs of training images may comprise generating high-quality simulated MR images as targets, as noted at 406, and generating undersampled MR images (e.g., corresponding undersampled versions of the high-quality simulated MR images) as inputs, as noted at 408.

At 410, method 400 includes training the artifact removal neural network on the training pairs. More specifically, training the artifact removal neural network on the image pairs includes training the artifact removal neural network to learn to map the undersampled images (e.g., the undersampled simulated MR images) to the high-quality images. In some embodiments, the artifact removal neural network may comprise a generative neural network. In some embodiments, the artifact removal neural network may comprise a generative neural network having a U-net architecture. In some embodiments, the artifact removal neural network may include one or more convolutional layers, which in turn comprise one or more convolutional filters (e.g., a convoluted neural network architecture.

For example, as noted at 412, training the artifact removal neural network may comprise training the artifact removal neural network for multiple-phase or multi-echo data. A multi-phase or multi-echo trained network may be applied for joint reconstruction methods, which may leverage information in multi-phase or multi-echo MR images in order to remove undersampling induced artifacts. In such examples, input and target output data may be formatted as x-y phase (or echo). The simulated multi-phase or multi-echo images may be 1-1 matched input to target. The output may be a selected phase or echo or quantitative maps, in some examples. An architecture of such a neural network will be further described with respect to FIG. 9.

In other examples, as noted at 414, training the artifact removal neural network may comprise training the artifact removal neural network for single-phase data. Such a trained network may be an iterative network. Similar to a multi-phase or multi-echo trained network, training a single-phase data network may include 1-1 matched input to target simulated images. Training the network for single-phase data may be based on an architecture similar to as will be described with respect to FIG. 10.

The convolutional filters of either architecture may comprise a plurality of weights, wherein the values of the weights are learned during a training procedure. The convolutional filters may correspond to one or more visual features/patterns, thereby enabling the artifact removal neural network to identify and extract features from the medical images. In other embodiments, the artifact removal neural network may not be a convolutional neural network, rather may be a different type of neural network.

Training the artifact removal neural network on the image pairs may include iteratively inputting an input image of each training image pair into an input layer of the artifact removal neural network. In some embodiments, each pixel intensity value of the input image may input into a distinct neuron of the input layer of the artifact removal neural network. The artifact removal neural network may map the input image to a corresponding target image by propagating the input image from the input layer, through one or more hidden layers, until reaching an output layer of the artifact removal neural network. In some embodiments, the output of the artifact removal neural network may be an image that has a reduced amount of undersampling oriented artifact, and therefore increased image quality, compared to the inputted undersampled MR image using traditional reconstruction methods. Further, deploying the artifact removal neural network trained to mitigate artifacts may reduce processing and/or computational demands as compared to, for example, advanced joint reconstruction methods that use temporal information. Thereby, scan time may be reduced as well.

The artifact removal neural network may be configured to iteratively adjust one or more of the plurality of weights of the artifact removal neural network in order to minimize a loss function, based on an assessment of differences between the input image and the target image comprised by each image pair of the training image pairs. In one embodiment, the loss function is a Mean Absolute Error (MAE) loss function, where differences between the input image and the target image are compared on a pixel-by-pixel basis and summed. In another embodiment, the loss function may be a Structural Similarity Index (SSIM) loss function. In other embodiments, the loss function may be a minimax loss function, or a Wasserstein loss function. It should be appreciated that the examples provided herein are for illustrative purposes, and other types of loss function may be used without departing from the scope of this disclosure.

The weights and biases of the artifact removal neural network may be adjusted based on a difference between the output image and the target (e.g., ground truth) image of the relevant image pair. The difference (or loss), as determined by the loss function, may be backpropogated through the neural learning network to update the weights (and biases) of the convolutional layers. In some embodiments, back propagation of the loss may occur according to a gradient descent algorithm, wherein a gradient of the loss function (a first derivative, or approximation of the first derivative) is determined for each weight and bias of the deep neural network. Each weight (and bias) of the artifact removal neural network is then updated by adding the negative of the product of the gradient determined (or approximated) for the weight (or bias) with a predetermined step size. Updating of the weights and biases may be repeated until the weights and biases of the artifact removal neural network converge, or the rate of change of the weights and/or biases of the deep neural network for each iteration of weight adjustment are under a threshold.

In order to avoid overfitting, training of the artifact removal neural network may be periodically interrupted to validate a performance of the artifact removal neural network on the test image pairs. In an embodiment, training of the artifact removal neural network may end when a performance of the artifact removal neural network on the test image pairs converges (e.g., when an error rate on the test set converges on or to within a threshold of a minimum value). In this way, the artifact removal neural network may be trained to generate a reconstruction of an input image, where the reconstruction of the input image includes less artifact than the input image.

In some embodiments, an assessment of the performance of the artifact removal neural network may include a combination of a minimum error rate and a quality assessment, or a different function of the minimum error rates achieved on each image pair of the test image pairs and/or one or more quality assessments, or another factor for assessing the performance of the artifact removal neural network. It should be appreciated that the examples provided herein are for illustrative purposes, and other loss functions, error rates, quality assessments, and/or performance assessments may be included without departing from the scope of this disclosure.

Referring now to FIG. 5, a flowchart of a method 500 for generating training data to train a artifact removal neural network, such as artifact removal neural network 302 of artifact removal neural network training system 300 of FIG. 3 is shown. The training data may comprise reference images of various types, where the reference images have a greater resolution and/or contrast to noise ratio (CNR) than undersampled MR images. Some portions of method 500 may be executed by a processor of an image processing system, such as the image processing system 202 of FIG. 2. In an embodiment, some operations of method 500 may be stored in non-transitory memory of the image processing system (e.g., in a training module such as the training module 210 of the image processing system 202 of FIG. 2) and executed by a processor of the image processing system (e.g., the processor 204 of image processing system 202 of FIG. 2).

At 502, method 500 includes generating simulated (e.g., synthetic) images from RGB images. The RGB images may be reference images, natural images, or the like that are not specifically acquired of a subject with a medical imaging system. Generating simulated complex-valued images from RGB images may comprise creating randomized phases using the RGB channels and simulating linear and/or non-linear phases. White or colored noise may be added to the simulated complex-valued images.

At 504, method 500 includes simulating motion in the simulated images. In some examples, simulating motion may comprise generating a randomized motion field to warp images and create images at different motion stages. As is discussed previously, medical imaging data, such as MR imaging data, is often subject to periodic motion as a result of processes such as respiration, bowel motion, etc. This periodic motion makes 1-1 matching of undersampled and fully sampled MR data difficult. The simulated images may include simulated motion that mimics motion phases seen in such imaging data. Thus, the training data may include motion data as is seen in MR imaging data. The motion field may compromise rigid and/or non-rigid motion. The motion field may be generated by simulating motions, such as random rotation, random shift, periodic respiratory motion, etc. The motion fields can also be derived from MR or other modality images, such as CT, Ultrasound, video etc. Multiple randomized motion fields may also be generated and applied periodically to simulate the periodic motion. The images at different motion stages are then generated by warping the reference image using the simulated motion fields. In some examples, the raw k-space data may be generated from the warped images by simulating MR acquisitions, such as Radial, PROPELLER, Spiral acquisition, etc. The simulated MR images at different motion stages can be generated from the simulated raw k-space data with motion.

Figure 7A:
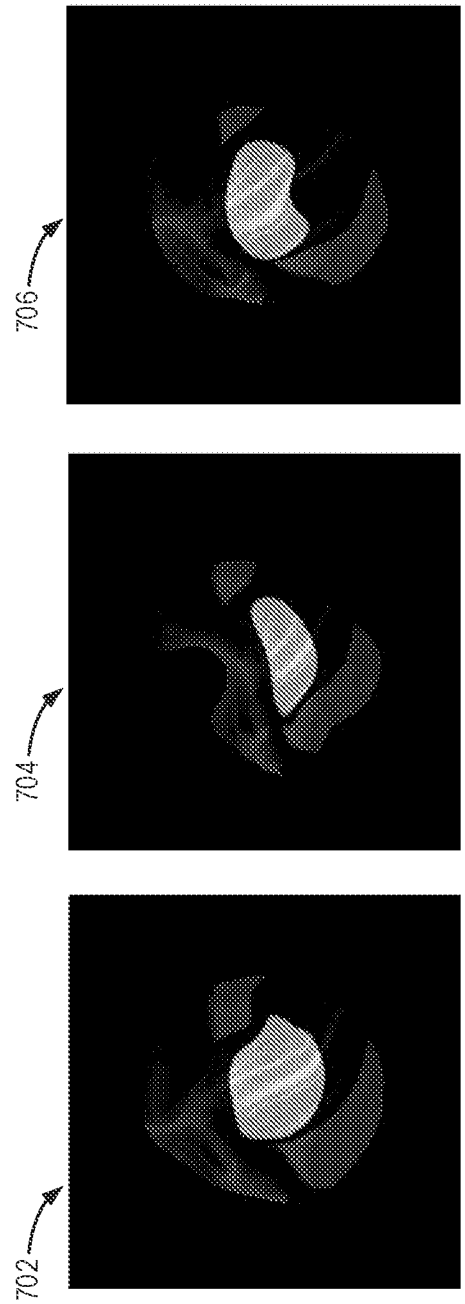
FIG. 7A shows example simulated images at different motion stages, in accordance with one or more embodiments of the present disclosure.

Turning briefly to FIG. 7A, examples simulated MR images at various motion stages are shown. A first image 702 may be warped to a first motion stage of a randomized motion field. A second image 704 may be warped to a second motion stage of the randomized motion field. A third image 706 may be warped to a third motion stage of the randomized motion field. In some examples, each of the motion stages may replicate known periodic motion stages. In this way, the simulated images may comprise data of various motions stages to allow the artifact removal neural network to be trained to recognize such motion stages and therefore the trained artifact removal neural network may be able to remove artifact from undersampled MR images that include motion.

Returning to FIG. 5, at 506, method 500 includes simulating contrasts in the simulated images. In some examples, simulating contrasts may comprise simulating signal evaluation and modulating signal intensity in each RGB channel. Signal evaluation may be a contrast enhancement curve. In some examples, MR imaging data may be acquired for contrast-enhanced protocols, whereby a contrast agent is injected into a subject and uptaken by various tissues in different manners, which defines different signal intensities in MR images. In multi-phase and/or multi-echo MR imaging, imaging data may be acquired at various time phases and/or echoes which produces different levels of contrast (e.g., different contrast phases) for each phase/echo. Each phase or echo, because of the differing contrasts during acquisition, may provide for visualize of a certain type of tissue (e.g., fat vs water). Simulating such different contrasts may provide for simulated images at different contrast levels (e.g., with different signal intensities), as may be seen in multi-phase, multi-echo, and/or other contrast-enhanced MR imaging data. Similar to simulating motion, simulation of different contrasts may enable the artifact removal neural network to be trained with input images of varying contrast levels and therefore at different phases or echoes. In some examples, contrast phases may be simulated in the same set of images in which motion was simulated. In other examples, contrast phases may be simulated for a different, new set of images than those in which motion was simulated.

Figure 7B:
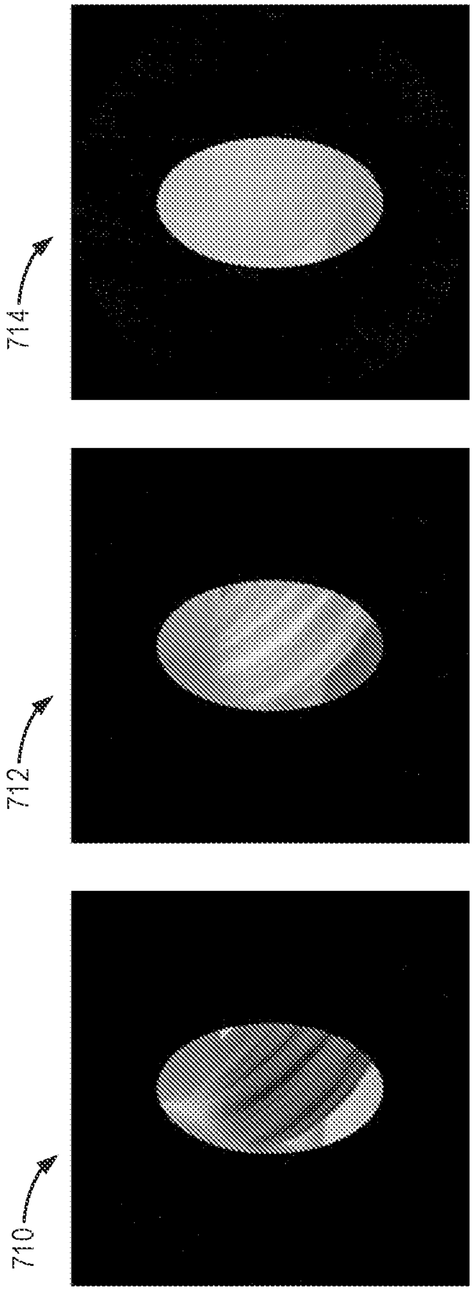
FIG. 7B shows second example simulated images at different phases, in accordance with one or more embodiments of the present disclosure.

Turning briefly to FIG. 7B, examples of simulated images at different phases or echoes are shown (e.g., with different contrast phases). A first image 710 may be simulated to replicate or estimate to a first contrast phase or echo. A second image 712 may be simulated to replicate or estimate a second contrast phase or echo. A third image 714 may be simulated to replicate or estimate a third contrast phase or echo. In some examples, each of the phases or echoes may replicate known phases or echoes used in MR imaging. In this way, the simulated images may comprise data of various phases and/or echoes to allow the artifact removal neural network to be trained to recognize such differing contrast levels and therefore the trained artifact removal neural network may be able to remove artifact from undersampled MR images that include different contrast levels from different phases and/or echoes.

Returning to FIG. 5, at 508, method 500 includes simulating phase contrast dynamics in the simulated images. In some examples, simulating phase contrast dynamics may comprise simulating phase changes with and/or without signal changes in the simulated images. In some MR or other modality applications, certain protocols utilize phases and/or echo changes, such as susceptibility-weighted imaging (e.g., susceptibility-weighted angiography), fast spoiled gradient echo imaging, 4D flow imaging, and others. Simulating such contrast dynamics in the simulated images may allow for the artifact removal neural network to be trained on input images that include such data. In some examples, phase contrast dynamics may be simulated in the same set of images in which motion and/or contrast phases were simulated. In other examples, phase contrast dynamics may be simulated for a different, new set of images than those in which motion and/or contrast phases were simulated. In this way, data of various types of imaging may have artifact removed by an artifact removal neural network trained on training images generated from the various simulated images.

At 510, method 500 includes generating training images based on the simulated images. As described with respect to FIG. 4, the training images may comprise input images and target images. The simulated images that comprise motion data, contrast data, and phase contrast dynamics data may be high-quality simulated MR images. The high-quality simulated MR images may be the target images of the training images. Input images may be corresponding undersampled versions of the simulated MR images, whereby the images are undersampled in the k-space. Sets of training images may each comprise 1-1 matched input and target images.

In some examples, a first set of training images may be based on images that simulate motion but do not include images that simulate contrast at various phases. This first set of training images may be used to train a first neural network, for example that may be used for MR imaging that is single-phase. In other examples, a second set of training images may be based on images that simulate contrasts at various phases but do not include images that simulated motion. This second set of training images may be used to train a second neural network, for example that may be used for MR imaging of low or no-motion regions of a body (e.g., brain MRIs, joint MRIs, etc.). In yet further examples, a third set of training images may be based on images that simulate both motion and contrast at various phases. This third set of training images may be used to train a third neural network, as may be deployed for MR imaging data that includes periodic motion and is multi-phase (e.g., multi-phase abdominal MRI). It should be appreciated that these are non-limiting examples and other sets of training images may be generated with combinations of motion, contrast phases, and phase contrast dynamics. In this way, the simulated images may be generated based on intended application of the neural network for which the images will be used to train.

Because of motion and/or contrast phase changes in acquired MR data, training data based on real MR images is not feasible. The method herein described provides for generation of training data that simulates motion and contrast phase changes to allow neural networks to be trained with relevant training images. In this way, images that comprise undersampling oriented artifact may have artifact remove via a trained neural network, thereby reducing the computational power demanded by reconstruction methods.

Figure 6:
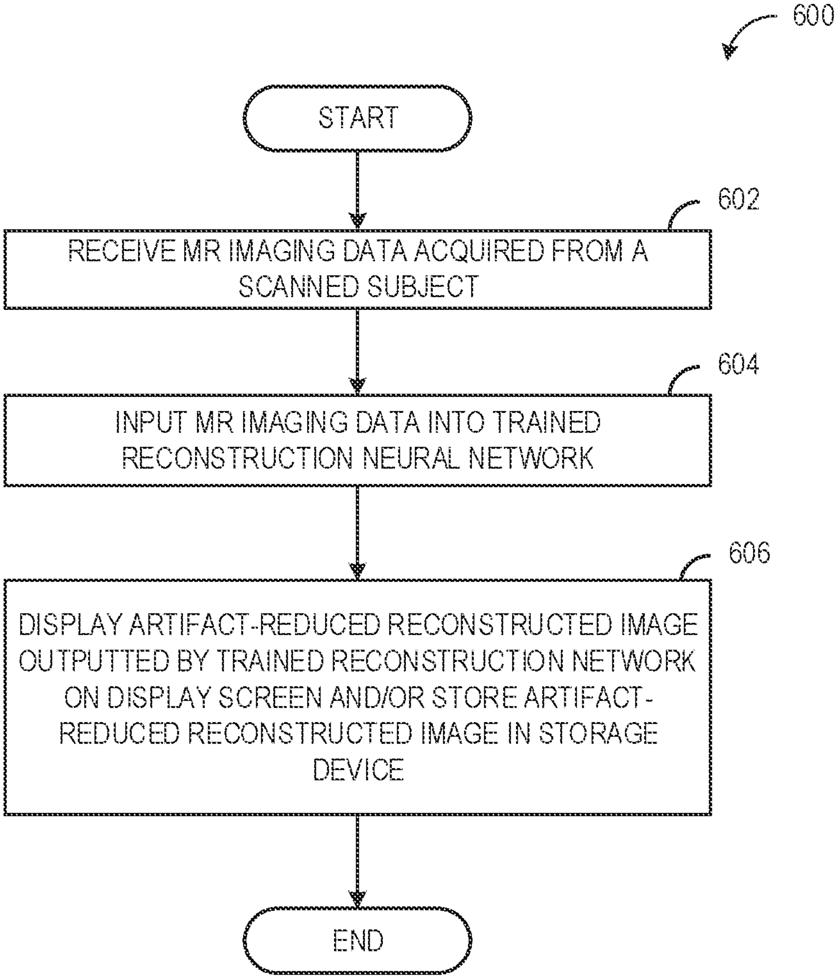
FIG. 6 shows a flowchart illustrating an exemplary method for removing artifact from undersampled MR images using a trained artifact removal neural network, in accordance with one or more embodiments of the present disclosure.

Referring now to FIG. 6, a flowchart is shown of a method 600 for deploying an artifact removal neural network, such as artifact removal neural network 302 of FIG. 3, to reduce artifact in real MR images. Method 600 may be executed by a processor of an image processing system, such as the image processing system 202 of FIG. 2. Some operations of method 600 may be stored in a non-transitory memory of the image processing system (e.g., in inference module 212 of the image processing system 202 of FIG. 2) and executed by a processor of the image processing system (e.g., the processor 204 of image processing system 202 of FIG. 2). In various embodiments, the noise reduction neural network may be trained as described above in reference to method 400 of FIG. 4, on synthetic training data generated as described above in reference to method 500 of FIG. 5. Specifically, the training data may include one or more sets of image pairs comprising simulated MR images comprising undersampled input images and fully sampled or otherwise high-quality target images.

Method 600 begins at 602, where method 600 includes receiving MR imaging data acquired from a subject. The MR imaging data may comprise, as an example, an MR image of the subject. For example, the MR image may be acquired using an MRI device such as MR imaging device 330 of FIG. 3, or MRI scanner 236 of the image processing system 202. The acquired MR image may be of a same region of interest, and/or may include a same set of anatomical structures as the set of RGB images (e.g., reference images, natural images, or the like) and simulated images on which the artifact removal neural network is trained. In some embodiments, the subject of the acquired MR image may be similar to subjects of the set of RGB images. For example, the subject may be a child, where the acquired MR image may be inputted into a first artifact removal neural network trained on RGB images of children; the subject may be female, where the acquired MR image may be inputted into a second artifact removal neural network trained on reference images of women; the subject may be male, where the acquired MR image may be inputted into a third artifact removal neural network trained on reference images of men; and so on.

At 604, the acquired MR imaging data is inputted into the trained artifact removal neural network. In various embodiments, inputting the acquired MR imaging data into the trained artifact removal neural network comprises inputting image data of each pixel of the acquired MR image into a corresponding node of an input layer of the noise reduction neural network. Values of the image data may be multiplied by weights at the corresponding nodes, and propagated through various hidden layers (e.g., convolutional layers) to an output layer of the noise reduction neural network. The output layer may include nodes corresponding to each pixel of an output MR image, where the output MR image is based on image data outputted by each node. The output image may have less artifact than the input image, where an amount of the artifact of the input image is reduced or removed by the trained artifact removal neural network.

At 606, method 600 includes displaying the artifact-reduced image outputted by the trained noise reduction neural network on a display screen of the image processing system (e.g., display device 234 of FIG. 2). The artifact-reduced image may be displayed on the display screen in real time during an examination of the subject, such that an operator of the image processing system (e.g., a caregiver) may review the artifact-reduced image during the examination. The artifact-reduced image may also be outputted to a storage device or a picture archiving and communication system (PACS) for subsequent retrieval and/or remote review. For example, the artifact-reduced image may be used to diagnose a condition of the subject. By reducing the amount of artifact in the acquired MR image, anatomical features of the subject may be more clearly visible to the caregiver, whereby the condition may be more easily diagnosed.

FIG. 8 shows an example input, target, and output MR image generated using trained artifact removal neural networks such as the artifact removal neural network herein described. An input image 800 may be an undersampled MR image acquired of a patient. Specifically, the input image 800 may be an abdominal MR image. The input image 800 may have a first amount of artifact (e.g., undersampling oriented artifact). A target image 804 may be a fully sampled (e.g., high-quality) version of the undersampled MR image with a second amount of artifact. The second amount of artifact may be less than the first amount of artifact of the input image 800.

An output image 802 may be outputted by a trained artifact removal neural network based on the input image 800 (e.g., where input image 800 is inputted into the trained artifact removal neural network to generate the output image 802). The artifact removal neural network is trained using simulated MR images, such as the simulated MR images described in relation to FIGS. 3 and 7A-B and generated as described in method 500 of FIG. 5. In other words, the artifact removal neural network is trained on image pairs including target MR images with low amounts of artifact (e.g., simulated MR images 312, and corresponding undersampled versions thereof (e.g., undersampled simulated MR images 316). The output image 802 may have a third amount of artifact. The third amount of artifact may more closely resemble the second amount of artifact of the target image 804 than the first amount of artifact. In this way, the output image 802 may have a reduced amount of artifact compared to the input image 800.

Referring to FIG. 9, an architecture diagram of a first neural network 900 is shown. The first neural network 900 may be the artifact removal neural network herein described when trained for multi-phase or multi-echo MR imaging. The first neural network 900 may be used to reduce artifact from undersampled MR images acquired by an MR imaging system, such as MRI apparatus 10 of FIG. 1. First neural network 900 may be trained in an artifact removal neural network training system, such as artifact removal neural network training system 300 of FIG. 3.

First neural network 900 may have an input layer, a plurality of convolutional layers, and an output layer. In the input layer, an input image 902 may be inputted into first neural network 900 and mapped to a set of features. Input image 902 may be of undersampled multi-phase or multi-echo data. The first neural network 900 may include a series of mappings, from the input image 902 through a plurality of iterative images (e.g., trainable blocks). For example, the input image 902 may be mapped to a first set of iterative images 904. The first set of iterative images 904 may be mapped to a second set of iterative images 906 and to a third set of iterative images 908. The second set of iterative images 906 may also be mapped to the third set of iterative images 908, as demonstrated by solid arrows 920. The third set of iterative images 908 may be mapped to an output image 910. In some examples, images may also have residual connections, as represented in the diagram by dashed lines. For example, first residual connection 912 may exist between the input image 902 and the output image 910, second residual connections 914 may exist between each of the iterative images of the first set of iterative images 904, third residual connections 916 may exist between each of the iterative images of the second set of iterative images 906, and fourth residual connections 918 may exist between each of the iterative images of the third set of iterative images 908. Each of the iterative images may be connected to a previous image and to a next image, wherein each iterative image receives input from a previous iterative image and transforms/maps the received input to an output to produce a next iterative image. In some examples, convolutional kernel size may increase or decrease between iterative images and in other examples, convolutional kernel size may be maintained between iterative images.

The output image 910 may be an estimated image based on the input image 902 and the plurality of iterative images based on input layers and output layers of the first neural network 900. The output image 910 may approximate a reference image based on the training of the first neural network 900, where the reference image is a target image of a pair of training images. Thus, the first neural network 900 illustrates a map of transformations that occur as input image 902 is propagated through layers of the network.

Training the first neural network 900 on training image pairs may include iteratively inputting input images as herein described into the input layer. In some embodiments, each pixel intensity value of the input image may input into a distinct neuron of the input layer of the first neural network 900. In some examples, the output of the first neural network 900 comprises a 2D matrix of values, wherein each value corresponds to a distinct intensity of a pixel of the input image, and wherein a distinct intensity of each pixel of the output image generates a reconstruction of the input image where an amount of artifact in one or more regions of the output image is lower than an amount of artifact in the one or more regions of the input image.

The weights (and biases) of the convolutional layers in the first neural network 900 are learned during training, as described in FIG. 4. During the training, a difference between output image 910 and the reference image (e.g., the ground truth data included in a corresponding training pair) may be back-propagated through the layers of the first neural network 900 to update the weights (And biases) of the convolutional layers, in accordance with a loss function. First neural network 900 may be trained on a plurality of training pairs of data, as previously described.

Turning to FIG. 10, an architecture diagram of a second neural network 1000 is shown. The second neural network 1000 may be the artifact removal neural network herein described when trained for single-phase MR imaging. The second neural network 1000 may be used to reduce artifact from undersampled MR images acquired by an MR imaging system, such as MRI apparatus 10 of FIG. 1. Second neural network 1000 may be trained in an artifact removal neural network training system, such as artifact removal neural network training system 300 of FIG. 3.

Second neural network 1000 may have an input layer, a plurality of convolutional layers, and an output layer. In the input layer, an input image 1004 may be inputted into second neural network 1000 and mapped to a set of features. Input image 1004 may be of undersampled data 1002. The second neural network 1000 may include a series of mappings, from the input image 1004 through a plurality of iterative images 1006. Each of the iterative images may be connected to a previous image and to a next image, wherein each iterative image receives input from a previous iterative image and transforms/maps the received input to an output to produce a next iterative image. Further, residual connections 1012 may be present between non-adjacent iterative images 1006. An nth iterative image may map to an output image 1008. The output image 1008 may be an estimated image based on the input image 1004 and the plurality of iterative images 1006 based on input layers and output layers of the second neural network 1000. The output image 1008 may approximate a reference image 1010 based on the training of the second neural network 1000, where the reference image 1010 is a target image of a pair of training images. Thus, the second neural network 1000 illustrates a map of transformations that occur as input image 1004 is propagated through layers of the network.

Similar to the first neural network 900, training the second neural network 1000 on training image pairs may include iteratively inputting input images as herein described into the input layer. In some embodiments, each pixel intensity value of the input image may input into a distinct neuron of the input layer of the second neural network 1000. In some examples, the output of the second neural network 1000 comprises a 2D matrix of values, wherein each value corresponds to a distinct intensity of a pixel of the input image, and wherein a distinct intensity of each pixel of the output image generates a reconstruction of the input image where an amount of artifact in one or more regions of the output image is lower than an amount of artifact in the one or more regions of the input image.

The weights (and biases) of the convolutional layers in the second neural network 1000 are learned during training, as described in FIG. 4. During the training, a difference between output image 1008 and the reference image (e.g., the ground truth data included in a corresponding training pair) may be back-propagated through the layers of the second neural network 1000 to update the weights (And biases) of the convolutional layers, in accordance with a loss function. Second neural network 1000 may be trained on a plurality of training pairs of data, as previously described.

Thus, system and methods are herein described for increasing a performance of an artifact-reducing or denoising neural network, by training the neural network on simulated (e.g., synthetic) MR image rather than real MR images. By using the simulated MR images rather than the real MR images, the neural network may more easily learn to distinguish artifact from anatomical features in an image. Unlike other approaches to generating simulated MR images based on using machine learning models, the simulated MR images described herein may be created based on RGB channels and factors that exist in real MR images, such as motion, contrast at different phases, and phase dynamics may be simulated in the simulated MR images. The simulated MR images may be generated from RGB channels that have higher resolution or CNR than real MR images and may be undersampled in the k-space to generate corresponding undersampled versions thereof. In this way, higher quality output MR images may be generated based on undersampled multi-phase or multi-echo input MR images as the artifact removal neural network is trained to detect and remove artifact from such undersampled images. Further, the trained artifact removal neural networks may reduce computational and processing power needed to remove artifact in MR images when compared to methods used to mitigate artifact in undersampled MR imaging data, such as advanced joint or mutual reconstruction methods. As the reconstruction methods need not remove artifact, processing demands may be reduced.

The disclosure also provides support for a method for an image processing system, comprising: generating a plurality of simulated images, generating a set of training image pairs based on the plurality of simulated images, training an artifact removal neural network using the set of training image pairs, and generating an output of the artifact removal neural network based on an inputted acquired image, wherein generating the plurality of simulated images comprises generating images from RGB images, simulating motion in the simulated images, simulating contrast in the simulated images, and simulating phase contrast dynamics in the simulated images. In a first example of the method, each of the set of training image pairs comprise an input image and a target image. In a second example of the method, optionally including the first example, the input image is an undersampled version of the simulated image and the target image is a high-quality simulated image. In a third example of the method, optionally including one or both of the first and second examples, the input image and the target image of a given training image pair are 1-1 matched. In a fourth example of the method, optionally including one or more or each of the first through third examples, the plurality of simulated images are simulated magnetic resonance (MR) images. In a fifth example of the method, optionally including one or more or each of the first through fourth examples, the inputted acquired image is an MR image acquired by an MRI scanner. In a sixth example of the method, optionally including one or more or each of the first through fifth examples, the MR image acquired by the MRI scanner is undersampled and comprises undersampling oriented artifacts. In a seventh example of the method, optionally including one or more or each of the first through sixth examples, the method further comprises: testing the trained artifact removal neural network with test image pairs generated from the simulated images. In a eighth example of the method, optionally including one or more or each of the first through seventh examples, the artifact removal neural network is a multi-phase network or multi-echo network. In a ninth example of the method, optionally including one or more or each of the first through eighth examples, the artifact removal neural network is a single-phase network or single-echo network.

The disclosure also provides support for an image processing system comprising: a processor communicably coupled to a non-transitory memory storing a neural network, the memory including instructions that when executed cause the processor to: receive a plurality of simulated MR images, each simulated MR image generated by simulating motion, contrast, and phase contrast dynamics, for each simulated MR image, generate an undersampled version of the simulated MR image, create a respective plurality of image pairs, each image pair including a simulated MR image as a target, ground truth image, and a corresponding undersampled version of the simulated MR image as an input image, train the neural network using the image pairs, deploy the trained neural network to generate artifact-reduced images from MR images acquired from a scanned subject, and display the artifact-reduced images on a display device of the image processing system. In a first example of the system, the MR images acquired from the scanned subject are undersampled multi-phase/echo images. In a second example of the system, optionally including the first example, each of the image pairs are 1-1 matched. In a third example of the system, optionally including one or both of the first and second examples, generating the undersampled version of the simulated MR image comprises undersampling the simulated MR image in k-space.

The disclosure also provides support for a method for creating simulated magnetic resonance (MR) images for training a model to reduce an amount of artifact in acquired MR images, the method comprising: obtaining a set of reference images, simulating a motion phase in one or more of the reference images, simulating a contrast phase in one or more of the reference images, simulating phase contrast dynamics in one or more of the reference images, generating simulated MR images of the reference images based on simulated motion phases, contrast phases, and phase contrast dynamics. In a first example of the method, the reference images have a higher resolution than the acquired MR images. In a second example of the method, optionally including the first example, the simulated MR images are undersampled in k-space to generate lower resolution versions of the simulated MR images. In a third example of the method, optionally including one or both of the first and second examples, the method further comprises: generating training image pairs, wherein the simulated MR images are targets and the lower resolution versions of the simulated MR images are inputs and wherein the inputs and targets are in x-y-phase format. In a fourth example of the method, optionally including one or more or each of the first through third examples, the model is a neural network model, and the method further comprises training the neural network model on training data including the training image pairs. In a fifth example of the method, optionally including one or more or each of the first through fourth examples, the method further comprises: deploying the neural network model to generate an artifact-reduced version of an inputted MR image.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for an image processing system, comprising:
- generating a plurality of simulated images;
- generating a set of training image pairs based on the plurality of simulated images;
- training an artifact removal neural network using the set of training image pairs; and
- generating an output of the artifact removal neural network based on an inputted acquired image, wherein generating the plurality of simulated images comprises:
- generating original simulated images from RGB images, wherein generating the original simulated images from the RGB images comprises creating randomized phases using RGB channels and simulating one or more of linear phases and non-linear phases,
- simulating motion in the original simulated images, wherein simulating motion in the simulated images comprises warping the simulated images using a randomized motion field and creating images at different motion stages to generate modified simulated images,
- simulating contrast in the modified simulated images, wherein simulating contrast in the modified simulated images comprises simulating signal evaluation and
- modulating signal intensity in each RGB channel to generate second modified simulated images, and
- simulating phase contrast dynamics in the second modified simulated images to generate the plurality of simulated images.

2. The method of claim 1, wherein each of the set of training image pairs comprise an input image and a target image.

3. The method of claim 2, wherein the input image is an undersampled version of the simulated image and the target image is a high-quality simulated image.

4. The method of claim 3, wherein the input image and the target image of a given training image pair are 1-1 matched.

5. The method of claim 1, wherein the plurality of simulated images are simulated magnetic resonance (MR) images.

6. The method of claim 1, wherein the inputted acquired image is an MR image acquired by an MRI scanner.

7. The method of claim 6, wherein the MR image acquired by the MRI scanner is undersampled and comprises undersampling oriented artifacts.

8. The method of claim 1, further comprising testing the trained artifact removal neural network with test image pairs generated from the simulated images.

9. The method of claim 1, wherein the artifact removal neural network is a multi-phase network or multi-echo network.

10. The method of claim 1, wherein the artifact removal neural network is a single-phase network or single-echo network.

11. An image processing system comprising:
- a processor communicably coupled to a non-transitory memory storing a neural network, the memory including instructions that when executed cause the processor to:
  - receive a plurality of simulated MR images, wherein the simulated MR images are generated from RGB images by creating randomized phases using RGB channels and simulating one or more of linear phases and non-linear phases, each simulated MR image generated by simulating first motion, second contrast, and third phase contrast dynamics;
  - for each simulated MR image, generate an undersampled version of the simulated MR image;
  - create a respective plurality of image pairs, each image pair including a simulated MR image as a target, ground truth image, and a corresponding undersampled version of the simulated MR image as an input image, wherein each of the image pairs are 1-1 matched;
  - train the neural network using the image pairs;
  - deploy the trained neural network to generate artifact-reduced images from MR images acquired from a scanned subject; and
  - display the artifact-reduced images on a display device of the image processing system.

12. The image processing system of claim 11, wherein the MR images acquired from the scanned subject are undersampled multi-phase/echo images.

13. The image processing system of claim 11, wherein generating the undersampled version of the simulated MR image comprises undersampling the simulated MR image in k-space.

14. A method for creating simulated magnetic resonance (MR) images for training a model to reduce an amount of artifact in acquired MR images, the method comprising:
- obtaining a set of reference images, wherein obtaining the set of reference images comprises generating the set of reference images from RGB images by creating randomized phases using RGB channels and simulating one or more of linear phases and non-linear phases;
- simulating a motion phase in one or more of the reference images, wherein simulating the motion phase in the one or more of the reference images comprises warping the one or more of the reference images using a randomized motion field and creating images at different motion stages to generate modified reference images;

simulating a contrast phase in one or more of the modified reference images, wherein simulating the contrast phase in the one or more of the modified reference images comprises simulating signal evaluation and modulating signal intensity in each RGB channel to generate second modified reference images; and simulating phase contrast dynamics in one or more of the second modified reference images to generate the simulated MR images.

15. The method of claim 14, wherein the reference images have a higher resolution than the acquired MR images.

16. The method of claim 14, wherein the simulated MR images are undersampled in k-space to generate lower resolution versions of the simulated MR images.

17. The method of claim 16, further comprising generating training image pairs, wherein the simulated MR images are targets and the lower resolution versions of the simulated MR images are inputs and wherein the inputs and targets are in x-y-phase format.

18. The method of claim 17, wherein the model is a neural network model, and the method further comprises training the neural network model on training data including the training image pairs.

19. The method of claim 18, further comprising deploying the neural network model to generate an artifact-reduced version of an inputted MR image.

* * * * *